United States Patent [19]
Marui et al.

[11] Patent Number: 5,559,730
[45] Date of Patent: Sep. 24, 1996

[54] SHIFT OPERATION UNIT AND SHIFT OPERATION METHOD

[75] Inventors: Shinichi Marui, Katano; Katsuhiko Ueda, Sakai, both of Japan

[73] Assignee: Matsushita Electric Industrial Co., Ltd., Kadoma, Japan

[21] Appl. No.: 386,732

[22] Filed: Feb. 10, 1995

[30] Foreign Application Priority Data

Feb. 18, 1994 [JP] Japan ................................. 6-021037

[51] Int. Cl.⁶ ....................................................... G06F 5/01
[52] U.S. Cl. ....................................................... 364/715.08
[58] Field of Search ............................... 364/715.08, 745, 364/749

[56] References Cited

U.S. PATENT DOCUMENTS

| | | | |
|---|---|---|---|
| 4,472,788 | 9/1984 | Yamazaki | 364/715.08 |
| 5,020,013 | 5/1991 | Maher, III et al. | 364/715.08 |
| 5,099,445 | 3/1992 | Studor et al. | 364/715.08 |
| 5,301,139 | 4/1994 | Zinger | 364/745 |
| 5,309,382 | 5/1994 | Tamura et al. | 364/715.08 |
| 5,379,240 | 1/1995 | Byrne | 364/715.08 |

FOREIGN PATENT DOCUMENTS

| | | |
|---|---|---|
| 285922 | 3/1990 | Japan . |
| 2195431 | 8/1990 | Japan . |
| 324614 | 2/1991 | Japan . |
| 378083 | 4/1991 | Japan . |

*Primary Examiner*—David H. Malzahn
*Attorney, Agent, or Firm*—Renner, Otto, Boisselle & Sklar P.L.L.

[57] ABSTRACT

A shift operation unit includes: a shift means for shifting data in accordance with a shift count and outputting the most significant part bit data, intermediate bit data, and least significant part bit data; first selection means coupled to an output of the shift means, for selecting one of the most significant part bit data and the least significant part bit data in accordance with a shift direction; first storage means coupled to an output of the first selection means, for storing data selected by the first selection means; operation means coupled to an output of the shift means and an output of the first storage means, for operating the intermediate bit data and the data stored in the first storage means and outputting an operation result; and second storage means coupled to an output of the operation means, for storing the operation result. A shift operation method is also provided.

14 Claims, 10 Drawing Sheets

SHIFT OPERATION UNIT AND SHIFT OPERATION METHOD

BACKGROUND OF THE INVENTION

1. Field of the Invention

The present invention relates to a shift operation unit and a shift operation method. More specifically, the present invention relates to a shift operation unit and a shift operation method for executing multiple-precision shift operation by use of hardware for processing single-precision data.

2. Description of the Related Art

With recent rapid progress in the field of digital technology, processors capable of executing high-level processing such as digital signal processing are required. Some of such high-level processing requires high operational precision. For example, a short-term prediction analysis processing in a CELP (code excited linear prediction) type voice CODEC requires an operational precision of the order of 36 bits. The CELP type voice CODEC is one of the voice CODECs which are indispensable for digital sound communication. It is not advisable, however, to realize high operational precision by means of hardware, because, in order to obtain high operational precision, the circuitry of a processor needs to be large, and thus the cost and power consumption increase. In order to overcome this problem, techniques for realizing double-precision operation by combining a plurality of commands using hardware for processing single-precision data have been developed. The double-precision operation includes double-precision addition, double-precision subtraction, double-precision shift operation, and the like.

FIG. 9 shows a conventional shift operation unit for executing double-precision shift operation by use of hardware for processing 24-bit data. The shift operation unit includes registers 110 and 111, a shifter 120 for shifting 24-bit data (A) in accordance with the shift count stored in the registers 110 and 111, an arithmetic and logic unit (ALU) 160 for operating 24-bit data (E) and 24-bit data (D) output from the shifter 120, and 24-bit registers 170, 171, and 172 for storing the operation results of the ALU 160.

Hereinbelow,, a method for shifting double-precision data leftward by N bit(s) by use of the shift operation unit having the above-described configuration will be described (N is an integer equal to or more than 1). In the following description, the double-precision data is composed of 24-bit data of the most significant part (hereinafter, referred to as MSP) and 24-bit data of the least significant part (hereinafter, referred to as LSP). The MSP data of the multiple-precision data to be shifted is stored in the register 170, while the LSP data thereof is stored in the register 171. Also, it is assumed that MSP data of the result of the double-precision shift operation is stored in the register 170, while LSP data thereof is stored in the register 172.

The shift N-bit leftward double-precision shift operation is executed as shown in FIG. 10.

(1) The shift count "N" is stored in the register 110.

(2) LSP data stored in the register 171 is input into the shifter 120 as data (A). The shifter 120 shifts the LSP data leftward by N bit(s). The ALU 160 outputs the output of the shifter 120 (data (D)) without processing (through-output), which is stored in the register 172 as LSP data.

(3) The shift count "–(24-N)" is stored in the register 111.

(4) LSP data stored in the register 171 is input into the shifter 120 as data (A). The shifter 120 shifts the LSP data rightward by (24-N) bit(s). The ALU 160 outputs the output of the shifter 120 (data (D)) without processing (through-output), which is stored in the register 171.

(5) MSP data stored in the register 170 is input into the shifter 120 as data (A). The shifter 120 shifts the MSP data leftward by N bit(s). The data stored in the register 171 is input into the ALU 160 as data (E). The ALU 160 executes OR operation of the output of the shifter 120 (data (D)) and the data (E). The output of the ALU 160 is stored in the register 170 as MSP data.

The above N-bit leftward double-precision shift operation requires three shiftings excluding the setting of the shift counts. When the setting of the shift counts is included, the total number of operations required for the double-precision shift operation is greater. On the contrary, other double-precision operations (double-precision addition, double-precision subtraction, etc.) only require about two operations, indicating that the double-precision shift operation is, in general, significantly inefficient compared with other multiple-precision operations.

LD-CELP (low-delay CELP), one of the CELP type voice CODECs, has the advantage of having low delay, and thus has attracted attention as a CODEC for communication by wire (ISDN, etc.). In LD-CELP, the short-term prediction analysis processing occupies a large portion of the entire processing thereof compared with other CODECs. As a result, double-precision operations of as many as about 500 thousand times/sec. are required. This is about 25 times the number of double-precision operations executed in voice CODECs used for portable digital telephones, such as VSELP (vector sum excited linear prediction) and PSI-SELP (pitch synchronous innovation CELP). Accordingly, in realizing LD-CELP, it is essential to improve the efficiency of the double-precision shift operation.

SUMMARY OF THE INVENTION

The shift operation unit of this invention includes: a shift means for shifting data in accordance with a shift count and outputting the most significant part bit data, intermediate bit data, and least significant part bit data for first selection means coupled to an output of the shift means, for selecting one of the most significant part bit data and the least significant part bit data in accordance with the shift direction; first storage means coupled to an output of the first selection means, for storing data selected by the first selection means; operation means coupled to an output of the shift means and an output of the first storage means, for operating the intermediate bit data and the data stored in the first storage means and outputting the operation result; and a second storage means coupled to the output of the operation means, for storing the operation result.

In one embodiment of the invention, the shift operation unit includes a second selection means for receiving additional data and selecting one of the additional data and the data stored in the first storage means in accordance with a control signal, wherein the output of the second selection means is input into the operation means.

In another embodiment of the invention, the shift means includes m $2^k$-bit shifter(s) (k=0, 1, ..., m–1), one $2^m$-bit shifter, and decoding means for decoding the shift count to supply a control signal indicating whether shifting should be executed or not to the respective $2^k$-bit shifter(s) and the $2^m$-bit shifter, where m is an integer equal to or more than 1.

In still another embodiment of the invention, a portion of the output of the $2^{m-1}$-bit shifter is equal to the output of the first selecting means.

In still another embodiment of the invention, the second storage means includes a plurality of registers each storing part of the operation result.

In still another embodiment of the invention, the second storage means includes a plurality of registers each storing part of the data and a plurality of registers each storing part of the operation result.

According to another aspect of the invention, an operation method for executing double-precision shift operation using first data and second data is provided. The method includes the steps of: a) shifting the first data in accordance with a shift count and the outputting the most significant part bit data, intermediate bit data, and least significant part bit data; b) storing the intermediate bit data output in step a) as part of the result of the shift operation; c) selecting one of the most significant part bit data and the least significant part bit data output in step a) in accordance with a shift direction; d) storing the data selected in step c); e) shifting the second data in accordance with the shift count and outputting most significant part bit data, intermediate bit data, and least significant part bit data; f) combining the intermediate bit data output in step e) and the data stored in step d); and g) storing the data combined in step f) as part of the result of the shift operation.

In one embodiment of the invention, the combination in step f) is achieved by executing OR operations of the intermediate bit data output in step e) and the data stored in step d).

In another embodiment of the invention, steps a) through d) are conducted as one step in the execution of the program, and steps e) through g) are conducted as one step in the execution of the program.

Alternatively, the method of operations of the invention for executing multiple-precision shift operations using first data, at least one second data, and third data includes the steps of: a) shifting the first data in accordance with a shift count and outputting the most significant part bit data, intermediate bit data, and least significant part bit data; b) storing the intermediate bit data output in step a) as part of the result of the shift operation; c) selecting one of the most significant part bit data and the least significant part bit data output in step a) in accordance with a shift direction; d) storing the data selected in step c); e) shifting at least one of the second data in accordance with the shift count and outputting the most significant part bit data, intermediate bit data, and least significant part bit data; f) selecting one of the most significant part bit data and the least significant part bit data output in step e) in accordance with a shift direction; g) storing the data selected in step f); h) combining the intermediate bit data output in step e) and the data stored most recently in steps d) and g); i) storing the data combined in step h) as part of the result of the shift operation; j) shifting the third data in accordance with the shift count and outputting the most significant part bit data, intermediate bit data, and least significant part bit data; k) combining the intermediate bit data output in step j) and the data stored most recently in step g); and l) storing the data combined in step k) as part of the result of the shift operation.

In one embodiment of the invention, the combination in step h) is achieved by executing OR operation of the intermediate bit data output in step e) and the data stored most recently in steps d) and g).

In another embodiment of the invention, the combination in step k) is achieved by executing OR operations of the intermediate bit data output in step j) and the data stored most recently in step g).

In still another embodiment of the invention, steps a) through d) are conducted as one step in the execution of a program, steps e) through i) are conducted as one step in the execution of the program, and steps j) through l) are conducted as one step in the execution of the program.

In still another embodiment of the invention, the method of operations further includes the step of repeating steps e) through i).

Thus, the invention described herein makes possible the advantages of (1) providing a shift operation unit capable of realizing efficient shift operations of multiple-precision data, and (2) providing a shift operation method for realizing efficient shift operation of multiple-precision data by use of the shift operation unit.

These and other advantages of the present invention will become apparent to those skilled in the art upon reading and understanding the following detailed description with reference to the accompanying figures.

DESCRIPTION OF THE PREFERRED EMBODIMENTS

The shift operation unit according to the present invention will be described by way of examples with reference to the accompanying drawings.

Figure 1:
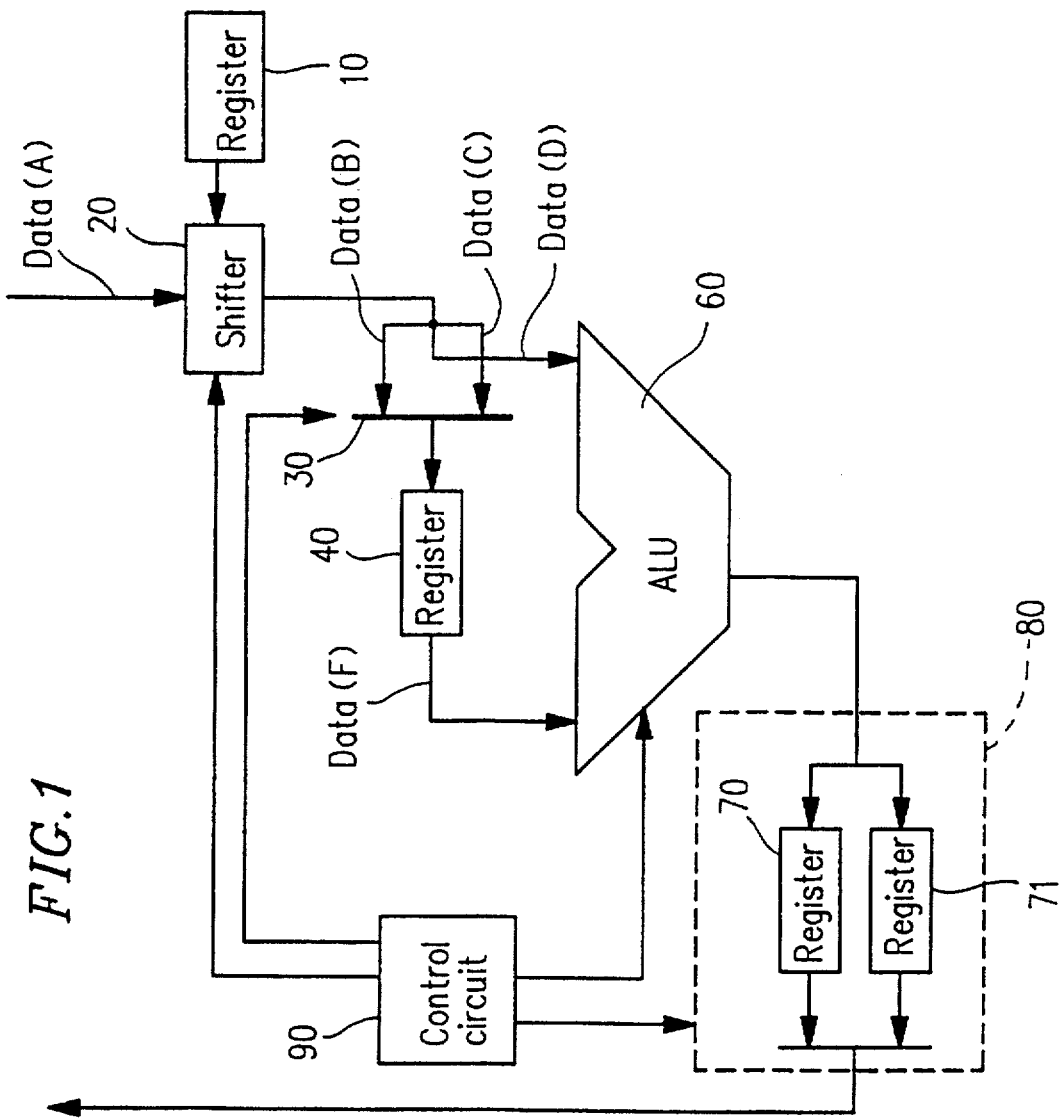
FIG. 1 illustrates a configuration of an examples of the shift operation unit according to the present invention.

FIG. 1 shows a configuration of an example of the shift operation unit according to the present invention. The shift operation unit of this example includes a shifter 20, a multiplexer 30, a register 40, an ALU 60, and an array of registers 80. The shifter 20 shifts data (A) in accordance with a given shift count, and outputs MSP bit data (B), LSP bit data (C), and intermediate bit data (D). The multiplexer 30 is coupled to the output of the shifter 20 and selects one of the two inputs, the MSP bit data (B) and the LSP bit data (C) in accordance with the shift direction. The register 40 is coupled to the output of the multiplexer 30 and stores the data selected by the multiplexer 30. The ALU 60 is coupled to the output of the shifter 20 and the output of the register 40, and operates the intermediate bit data (D) output from the shifter 20 and the data selected by the multiplexer 30. The array of registers 80 are coupled to the output of the ALU 60 and store the operation results from the ALU 60.

In this example, all of data (A) to (D) are 16-bit data. However, the number of bits is not limited to 16 bits for the application of the present invention.

The shift count given to the shifter 20 is stored in the register 10. When the shift count stored in the register 10 is a negative number, the shifter 20 shifts data (A) leftward by the absolute of the shift count. When the shift count stored in the register 10 is a positive number, the shifter 20 shifts data (A) rightward by the shift count.

Control signals are supplied to the shifter 20, the multiplexer 30, the ALU 60, and the array of registers 80 from a control circuit 90.

The shifter 20 receives a control signal indicating whether an arithmetic shift or logical shift should be operated. In accordance with this control signal, the shifter 20 operates; either the arithmetic shift or the logical shift.

The multiplexer 30 receives a control signal indicating the shift direction. When the multiplexer 30 receives a control signal indicating that the shift direction is leftward, the multiplexer 30 selects the MSP bit data (B) output from the shifter 20. When the multiplexer 30 receives a control signal indicating that the shift direction is rightward, the multiplexer 30 selects the LSP bit data (C) output from the shifter 20. The shift direction can be determined by referring to the most significant bit of the shift count stored in the register 10. Therefore, the multiplexer 30 may be directly controlled in accordance with the value of the most significant bit of the shift count.

The ALU 60 executes various arithmetic or logical operations in accordance with a control signal supplied by the control circuit 90. The arithmetic operations include binary and decimal addition, subtraction, multiplication, division, and arithmetic shift operations, for example. The logical operations include AND, OR, and exclusive OR (XOR), for example. The control signal supplied to the ALU 60 is obtained by decoding commands included in the program. For example, the ALU 60 works as an adder for an addition command, while the ALU 60 works as an OR operator for an OR command. In order to execute double-precision shift operations, the ALU 60 requires at least two functions: a function which outputs one of two data input into the ALU 60 without processing (through-output); and a function which executes OR operation for two data input into the ALU 60.

The array of registers 80 includes a register 70 and a register 71. Before the start of double-precision shift operation, MSP 16-bit data of the double-precision data to be shifted is stored in the register 70, while LSP 16-bit data thereof is stored in the register 71. After the double-precision shift operation, MSP 16-bit data of the operation result output from the ALU 60 is stored in the register 70, while LSP 16-bit data thereof is stored in the register 71.

Alternatively, the array of registers 80 may be configured so that the registers for storing MSP data and LSP data before the double-precision shift operation are different from those for storing MSP data and LSP data after the double-precision shift operation.

Figure 2:
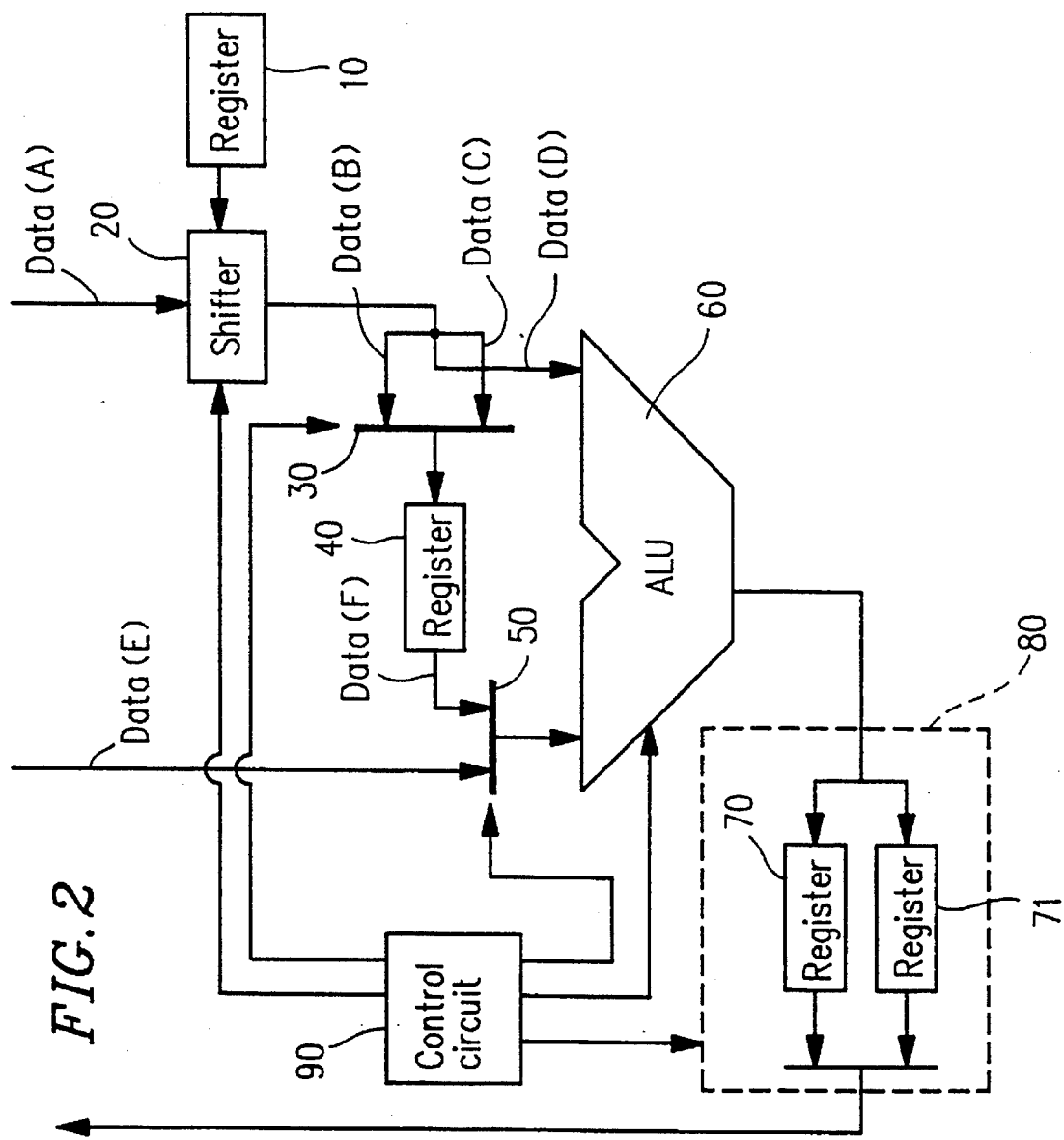
FIG. 2 illustrates a configuration of another example of the shift operation unit according to the present invention.
Figure 2:
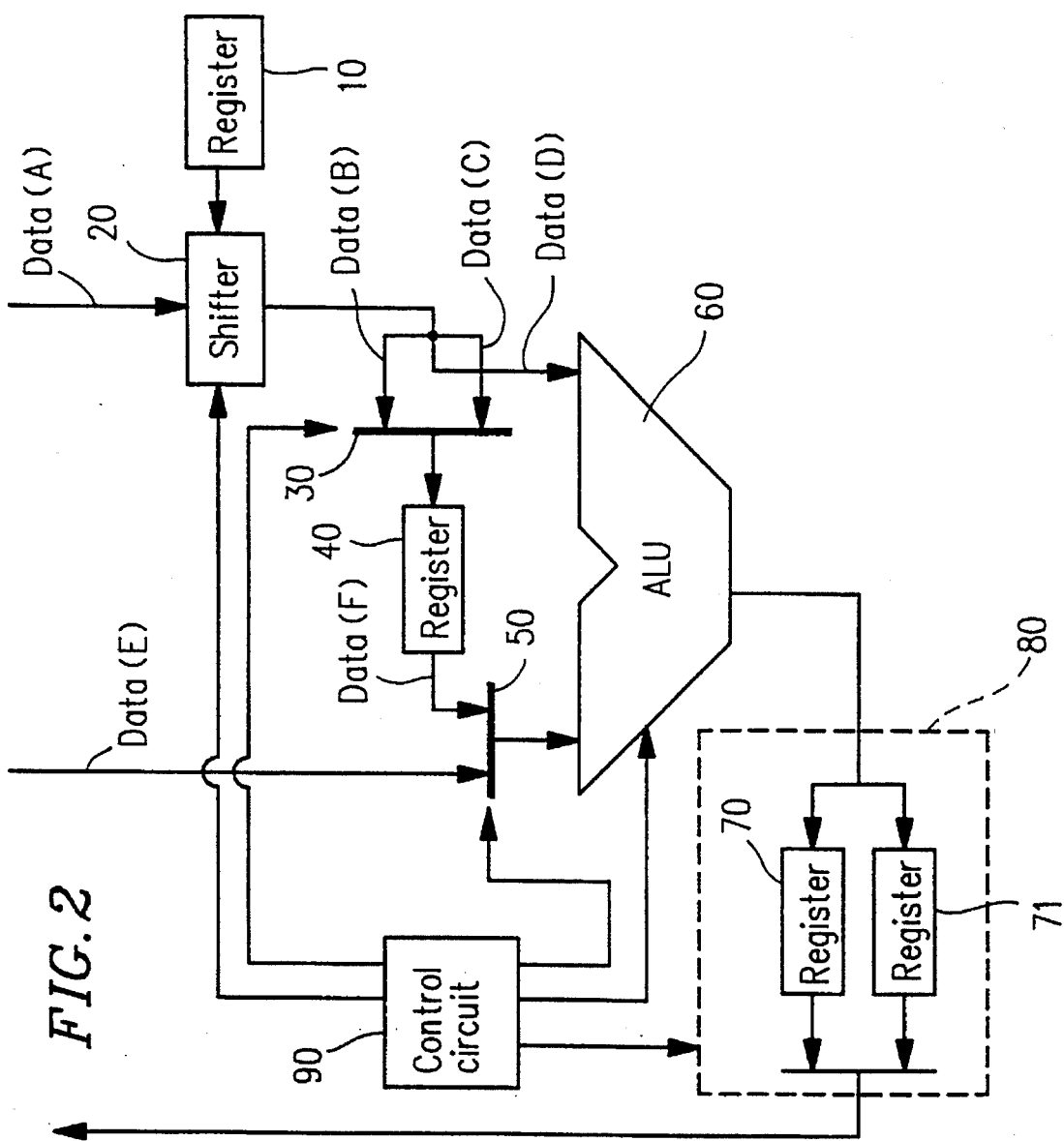

FIG. 2 shows a configuration of another example of the shift operation unit according to the present invention. The shift operation unit of FIG. 2 has the same configuration as that of the shift operation unit of FIG. 1, except that a multiplexer 50 is additionally provided. Accordingly, only the operation of the multiplexer 50 will be described hereinbelow.

The multiplexer 50 outputs one of two inputs thereof in accordance with a control signal supplied by the control circuit 90. One of the two inputs of the multiplexer 50 is coupled to the output of the register 40 and the other of the two inputs of the multiplexer 50 is coupled to data (E).

When a double-precision shift operation is executed, the multiplexer 50 is controlled so as to always select the data stored in the register 40. Accordingly, the multiplexer 50 is not required for the execution of the double-precision shift operation. For operations other than the double-precision shift operation (AND operations, for example), the multiplexer 50 may be controlled to select data (E), so as to realize various operations by use of the ALU 60.

Figure 3:
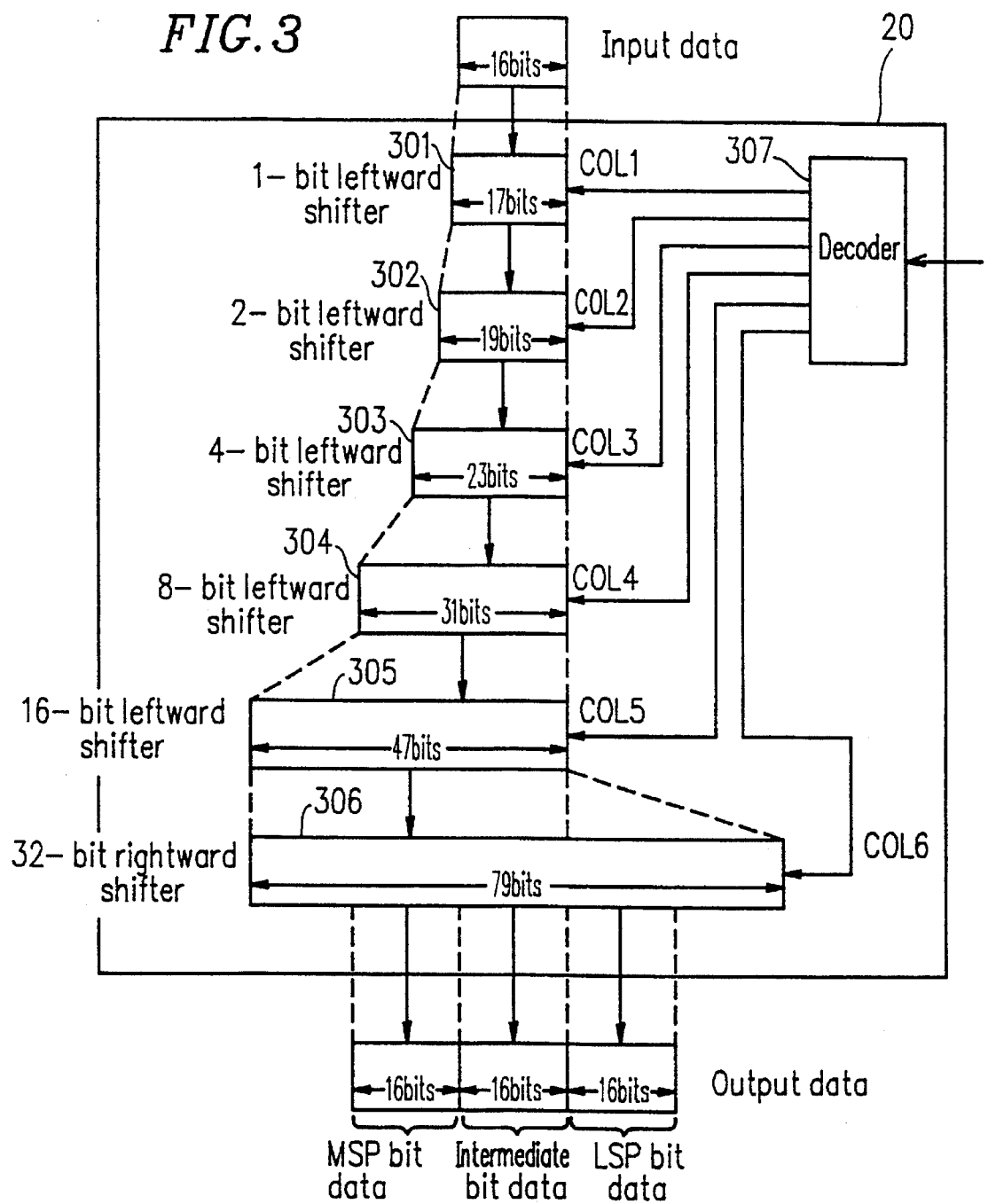
FIG. 3 illustrates a configuration of a shifter shown in FIG. 1.

FIG. 3 shows a configuration of the shifter 20 shown in FIG. 1. The shifter 20 realizes shifts in the range of $(2^5-1)$-bit leftward shift to $2^5$-bit rightward shift by combining six shifters. The shifter 20 includes a 1-bit leftward shifter 301, a 2-bit leftward shifter 302, a 4-bit leftward shifter 303, an 8-bit leftward shifter 304, a 16-bit leftward shifter 305, and a 32-bit rightward shifter 306. The shifter 20 further includes a decoder 307 which generates control signals COL1 to COL6 by decoding the shift count. The states of the control signals COL1 to COL6 are either active or inactive. The control signal from the control circuit 90 indicating either an arithmetic shift or logical shift is supplied to the respective shifters 301 to 306 (In FIG. 3, control lines for the latter control signal are omitted).

The 1-bit leftward shifter 301 receives the 16-bit data input into the shifter 20 and determines whether or not it shifts the 16-bit data leftward by one bit in accordance with the control signal COL1. When the control signal COL1 is active, the shifter 301 shifts the 16-bit data leftward by one bit. When the control signal COL1 is inactive, the shifter 301 just outputs the 16-bit data without shifting. The shifter 301 outputs 17-bit data. The least significant bit of the 17-bit data output from the shifter 301 corresponds to the least significant bit of the 16-bit data input into the shifter 301.

The 2-bit leftward shifter 302 receives the 17-bit data output from the shifter 301 and determines whether or not it shifts the 17-bit data leftward by two bits in accordance with the control signal COL2. When the control signal COL2 is active, the shifter 302 shifts the 17-bit data leftward by two bits. When the control signal COL2 is inactive, the shifter 302 just outputs the 17-bit data without shifting. In either case, the shifter 302 outputs 19-bit data. The least significant bit of the 19-bit data output from the shifter 302 corresponds to the least significant bit of the 17-bit data input into the shifter 302.

The shifters 303 to 305 also operate as the shifters 301 and 302 described above.

The 32-bit rightward shifter 306 receives 47-bit data output from the shifter 305 and determines whether or not it shifts the 47-bit data rightward by 32 bits in accordance with the control signal COL6. When the control signal COL6 is active, the shifter 306 shifts the 47-bit data rightward by 32 bits. When the control signal COL6 is inactive, the shifter 306 just outputs the 47-bit data without shifting. The shifter 306 includes 79 bits from the 78th bit (the most significant bit) to the 0th bit (the least significant bit). The 32nd bit of the shifter 306 corresponds to the least significant bit of the 47-bit data output from the shifter 305. The shifter 306 outputs 16-bit data ranging from the 63rd bit to the 48th bit of the 79-bit data as MSP bit data (B), 16-bit data ranging from the 47th bit to the 32nd bit as intermediate bit data (D), and 16-bit data ranging from the 31st bit to the 16th bit as LSP bit data (C).

For example, in shifting data leftward by 10 bits, the decoder 307 operates so as to set the control signals COL2 and COL4 to be active, while the control signals COL1, COL3, COL5, and COL6 to be inactive. In response to these control signals, the shifters 302 and 304 shift the respective input data, while the shifters 301, 303, 305, and 306 just output the respective input data without shifting.

In shifting data rightward by 10 bits, the decoder 307 operates so as to set the control signals COL2, COL3, COL5, and COL6 to be active, while the control signals COL1 and COL4 inactive. In response to these control signals, the data is first shifted leftward by 22 bits by the shifters 302, 303, and 305, and then shifted rightward by 32 bits by the shifter 306. As a result, data shifted rightward by 10 bits is obtained.

Figure 4:
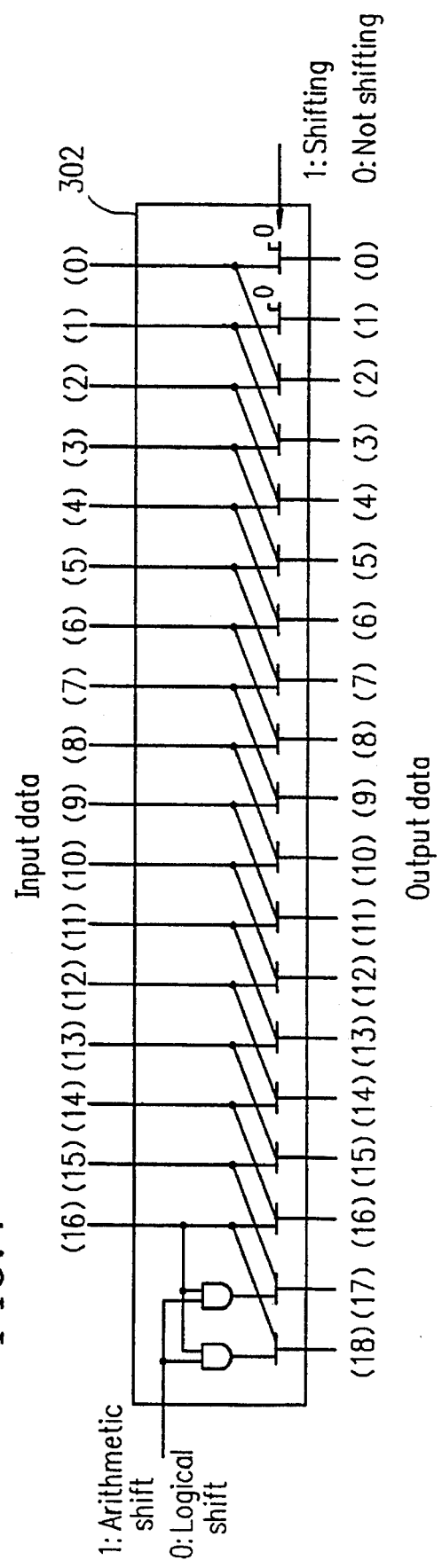
FIG. 4 illustrates a configuration of a 2-bit leftward shifter shown in FIG. 3.

FIG. 4 shows a configuration of the 2-bit leftward shifter 302 shown in FIG. 3. The shifter 302 receives the control signal indicating either arithmetic shift or logical shift and the control signal COL2 indicating either shifting or not-shifting. The shifter 302 includes a plurality of multiplexers and a plurality of AND circuits.. The AND circuits are used to sign extend the most significant two bits of the data to be output from the shifter 302 in the case of the arithmetic shift and not-shifting operation, in accordance with the value of the most significant bit of the data input into the shifter 302. The configurations of the other shifters 301, 303, 304, 305, and 306 are basically the same as that of the shifter 302 described above.

In general, the shifter 20 may have (m+1) shifters to realize shifts in the range of $(2^m-1)$-bit leftward shift to $2^m$-bit rightward shift, where m is an integer equal to or more than 1. The (m+1) shifters are composed of m $2^k$-bit leftward shifter(s) (k=0, 1, ..., m−1) and one $2^m$-bit rightward shifter. The configuration of the shifter 20 shown in FIG. 3 corresponds to the case where m=5.

Alternatively, in the configuration of the shifter 20 shown in FIG. 3, 16-bit data ranging from the 47th bit to the 32nd bit of the shifter 306 may be output as intermediate bit data (D), and 16-bit data ranging from the 31st bit to the 16th bit of the shifter 305 may be output as MSP/LSP bit data. In this alternative configuration, the MSP/LSP bit data is equal to the output of the multiplexer 30 shown in FIG. 1. In this case, therefore, the multiplexer 30 can be omitted by coupling the output of the shifter 20 to one of the inputs of the ALU 60.

Furthermore, the shifter 20 may include m $2^k$-bit rightward shifter(s) (k=0, 1, ..., m−1) and one $2^m$-bit leftward shifter in order to realize shifts in the range of $(2^m-1)$-bit rightward shift to the 2m-bit leftward shift.

The method for executing the double-precision shift operation by use of the shift operation unit having the above configuration will be described.

Hereinbelow, the case where double-precision data is logically shifted leftward by N bit(s) will be first described (N is an integer equal to or more than 1). In the following description, the double-precision data is composed of MSP 16-bit data and LSP 16-bit data. It is assumed that the MSP 16-bit data and the LSP 16-bit data are stored in the registers 70 and 71, respectively. Also assumed is that MSP data and LSP data of the result of the double-precision shift operation are stored in the registers 70 and 71, respectively.

Figure 5:
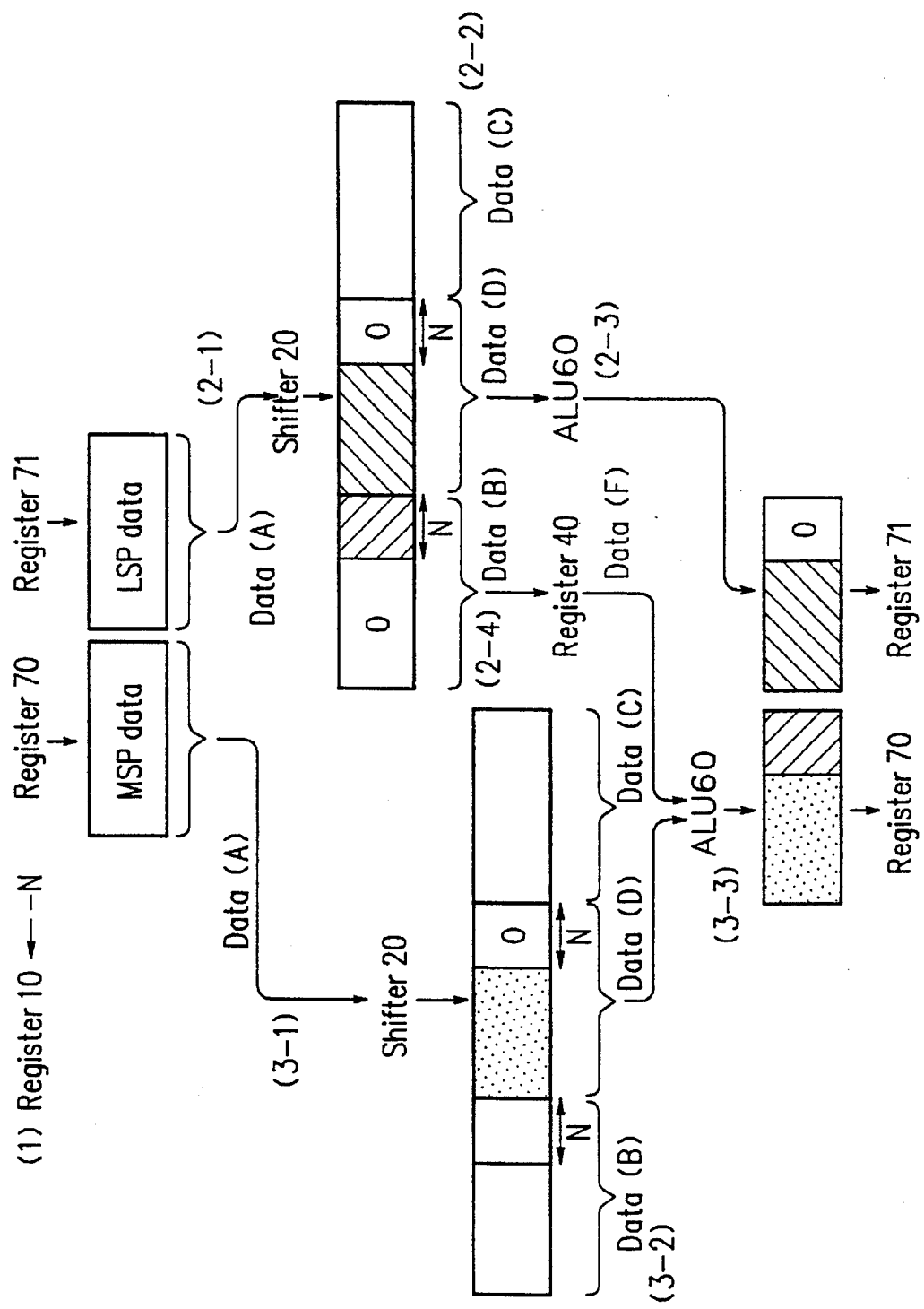
FIG. 5 schematically illustrates a procedure of N-bit leftward double-precision shift operation according to the present invention.

FIG. 5 schematically shows the procedure of the N-bit leftward double-precision shift operation. The reference numerals in parentheses in FIG. 5 correspond to the following step numbers.

Step 1: The shift count "−N" is stored in the register 10.

Step 2-1: LSP data is read from the register 71 and input into the shifter 20 as data (A).

Step 2-2: The shifter 20 logically shifts the LSP data leftward by N bit(s) and outputs MSP bit data (B), intermediate bit data (D), and LSP bit data (C).

Step 2-3: The ALU 60 outputs the intermediate bit data (D) output from the shifter 20 without shifting (through-output). The output of the ALU 60 is stored in the register 71 as LSP data.

Step 2-4: The multiplexer 30 selects the MSP bit data (B) from the two inputs, the MSP bit data (B) and the LSP bit data (C) output from the shifter 20, and the selected MSP bit data (B) is stored in the register 40.

Step 3-1: MSP data is read from the register 70 and input into the shifter 20 as data (A).

Step 3-2: The shifter 20 logically shifts the MSP data leftward by N bit(s) and outputs MSP bit data (B), intermediate bit data (D), and LSP bit data (C).

Step 3-3: The ALU 60 executes the OR operation of the intermediate bit data (D) output from the shifter 20 and data (F) stored in the register 40. The output of the ALU 60 is stored in the register 70 as MSP data.

Thus, the N-bit leftward double-precision shift operation is realized. In the above procedure, steps 2-1 through 2-4 are conducted as one step in the execution of the program, and steps 3-1 through 3-3 are conducted as one step in the execution of the program.

Incidentally, in the case where double-precision data is arithmetically shifted leftward by N bit(s), the arithmetic shift may be operated instead of the logical shift operation only at step 3-2. It is only the MSP data that is related to the selection of logical shift or arithmetic shift.

Then, the case where double-precision data is logically shifted rightward by N bit(s) will be described (N is an integer equal to or more than 1). In this case, the double-precision data is composed of MSP 16-bit data and LSP 16-bit data. It is assumed that the MSP 16-bit data and the LSP 16-bit data are stored in the registers 70 and 71, respectively. Also assumed is that MSP data and LSP data of the result of the double-precision shift operation are stored in the registers 70 and 71, respectively.

Figure 6:
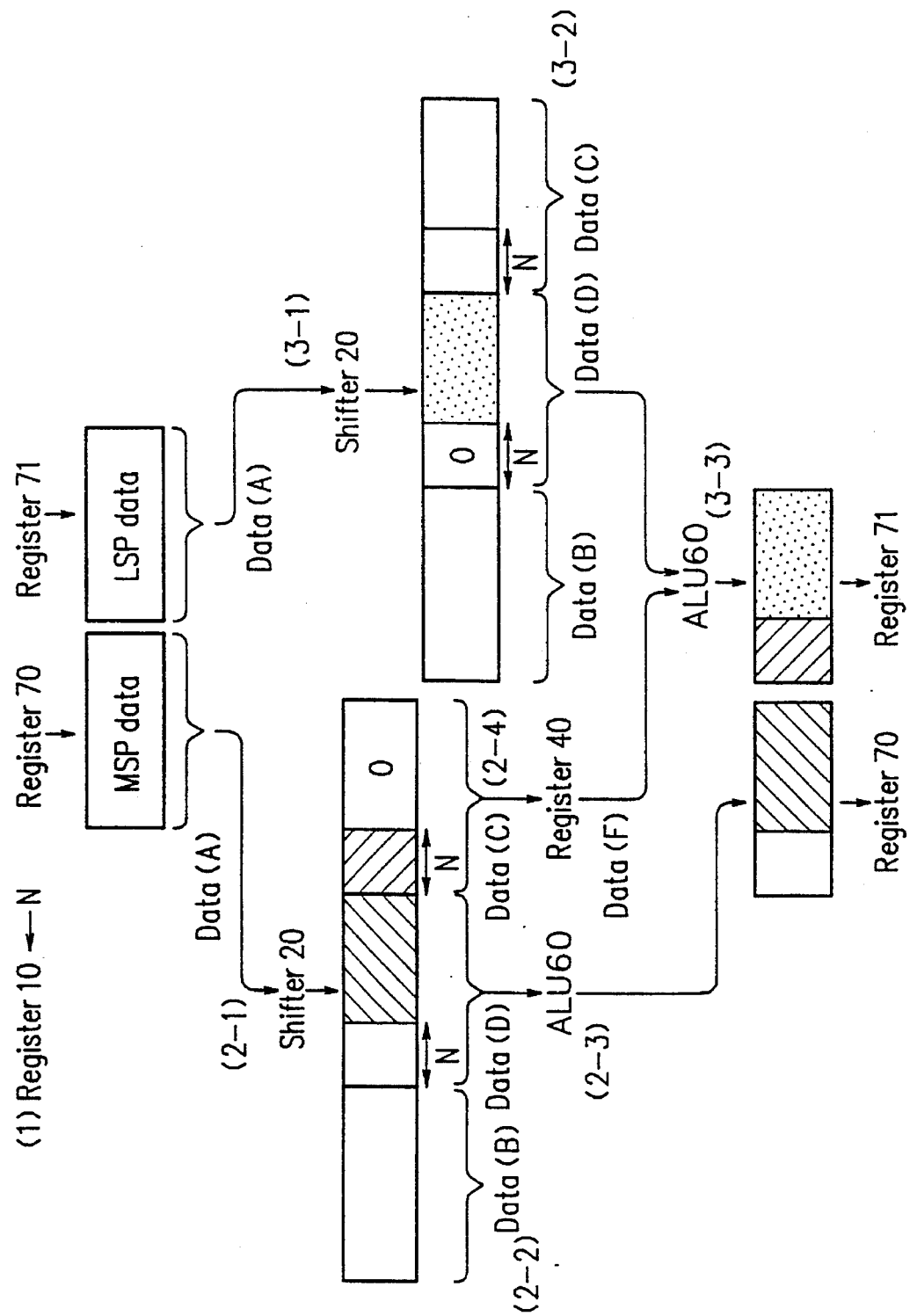
FIG. 6 schematically illustrates a procedure of N-bit rightward double-precision shift operation according to the present invention.

FIG. 6 schematically shows the procedure of the N-bit rightward double-precision shift operation. The reference numerals in parentheses in FIG. 6 correspond to the following step numbers.

Step 1: The shift count "N" is stored in the register 10.

Step 2-1: MSP data is read from the register 70 and input into the shifter 20 as data (A).

Step 2-2: The shifter 20 logically shifts the MSP data rightward by N bit(s) and outputs MSP bit data (B), intermediate bit data (D), and LSP bit data (C).

Step 2-3: The ALU 60 outputs the intermediate bit data (D) output from the shifter 20 without shifting (through-output). The output of the ALU 60 is stored in the register 70 as MSP data.

Step 2-4: The multiplexer 30 selects the LSP bit data (C) from the two inputs, the MSP bit data (B) and the LSP bit data (C) output from the shifter 20, and the selected LSP bit data (C) is stored in the register 40.

Step 3-1: LSP data is read from the register 71 and input into the shifter 20 as data (A).

Step 3-2: The shifter 20 logically shifts the LSP data rightward by N bit(s) and outputs MSP bit data (B), intermediate bit data (D), and LSP bit data (C).

Step 3-3: The A1U 60 executes the OR operation of the intermediate bit data (D) output from the shifter 20 and data (F) stored in the register 40. The output of the ALU 60 is stored in the register 71 as LSP data.

Thus, the N-bit rightward double-precision shift operation is realized. In the above procedure, steps 2-1 through 2-4 are conducted as one step in the execution of the program, and steps 3-1 through 3-3 are also conducted as one step in the execution of the program.

Incidentally, in the case where double-precision data is arithmetically shifted rightward by N bit(s), the arithmetic shift is operated instead of the logical shift only at step 2-2. It is only the MSP data that is related to the selection of logical shift or arithmetic shift.

In the above examples, it was assumed that the 2-word double-precision data are stored in the registers 70 and 71. However, the present invention is not limited to this configuration. Two-word double-precision data may be stored in other holding circuits, and the data may be input into the shift operation unit as data (A) or data (E).

Next, the case where triple-precision data is logically shifted leftward by N bit(s) will be described (N is an integer equal to or more than 1). In this case, the triple-precision data is composed of MSP 16-bit data, intermediate 16-bit data, and LSP 16-bit data. A register 72 (not shown in FIG. 1) is used in addition to the registers 70 and 71 shown in FIG. 1.

It is assumed that the MSP 16-bit data, the intermediate 16-bit data, and the LSP 16-bit data are stored in the registers 70, 71, and 72, respectively. Also assumed is that MSP data, intermediate data, and LSP data of the operation result of the triple-precision shift operation are stored in the registers 70, 71, and 72, respectively.

Figure 7:
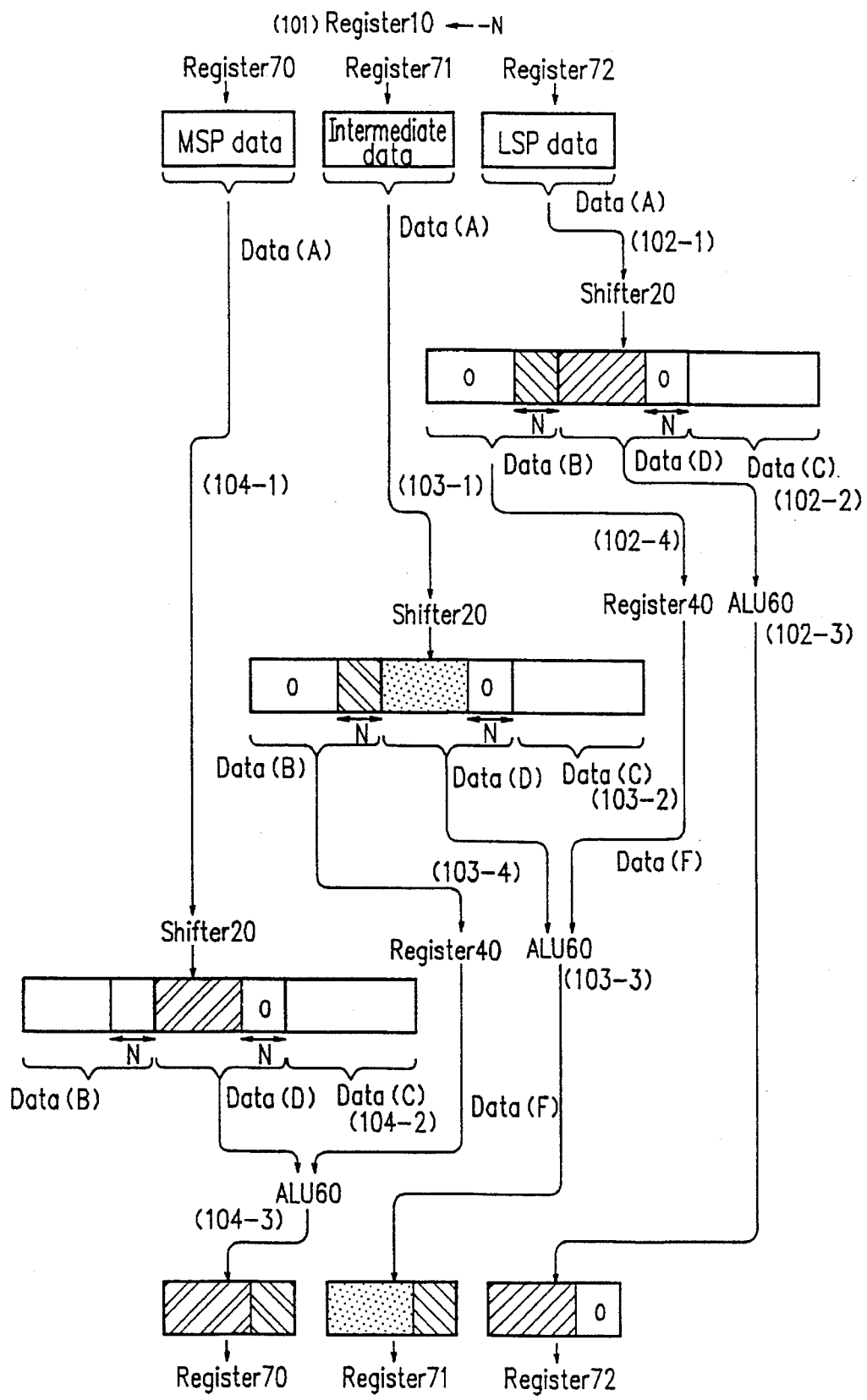
FIG. 7 schematically illustrates a procedure of N-bit leftward triple-precision shift operation according to the present invention.

FIG. 7 schematically shows the procedure of the N-bit leftward triple-precision shift operation. The reference numerals in parentheses in FIG. 7 correspond to the following step numbers.

Step 101: The shift count "−N" is stored in the register 10.

Step 102-1: LSP data is read from the register 71 and input into the shifter 20 as data (A).

Step 102-2: The shifter 20 logically shifts the LSP data leftward by N bit(s) and outputs MSP bit data (B), intermediate bit data (D), and LSP bit data (C).

Step 102-3: The ALU 60 outputs the intermediate bit data (D) output from the shifter 20 without shifting (through-output). The output of the ALU 60 is stored in the register 72 as LSP data.

Step 102-4: The multiplexer 30 selects the MSP bit data (B) from the two inputs, the MSP bit data (B) and the LSP bit data (C) output from the shifter 20, and the selected MSP bit data (B) is stored in the register 40.

Step 103-1: Intermediate data is read from the register 71 and input into the shifter 20 as data (A).

Step 103-2: The shifter 20 logically shifts the intermediate data leftward by N bit(s) and outputs MSP bit data (B), intermediate bit data (D), and LSP bit data (C).

Step 103-3: The ALU 60 executes the OR operation of the intermediate bit data (D) output from the shifter 20 in step 103-2 and the data (F) stored in the register 40 in step 102-4. The output of the ALU 60 is stored in the register 71 as intermediate data.

Step 103-4: The multiplexer 30 selects the MSP bit data (B) from the two inputs, the MSP bit data (B) and the LSP bit data (C) output from the shifter 20 in step 103-2. The selected MSP bit data (B) is stored in the register 40.

Step 104-1: MSP data is read from the register 70 and input into the shifter 20 as data (A).

Step 104-2: The shifter 20 logically shifts the MSP data leftward by N bit(s) and outputs MSP bit data (B), intermediate bit data (D), and LSP bit data (C).

Step 104-3: The ALU 60 executes the OR operation of the intermediate bit data (D) output from the shifter 20 in step 104-2 and data (F) stored in the register 40 in step 103-4. The output of the ALU 60 is stored in the register 70 as MSP data.

Thus, the N-bit leftward triple-precision shift operation is realized. In the above procedure, steps 102-1 through 102-4 are conducted as one step in the execution of the program, steps 103-1 through 103-4 are conducted as one step in the execution of the program, and steps 104-1 through 104-3 are conducted as one step in the execution of the program.

Incidentally, in the case where triple-precision data is arithmetically shifted leftward by N bit(s), the arithmetic shift may be operated instead of the logical shift at step 104-2:. It is only the MSP data that is related to the selection of logical shift or arithmetic shift.

Similarly, N-bit rightward triple-precision shift operation can be realized.

In general, N-bit M-multiple-precision shift operation can be realized (M is an integer equal to or more than 3). The above triple-precision shift operation described with reference to FIG. 7 is an example when M=3.

Figure 8:
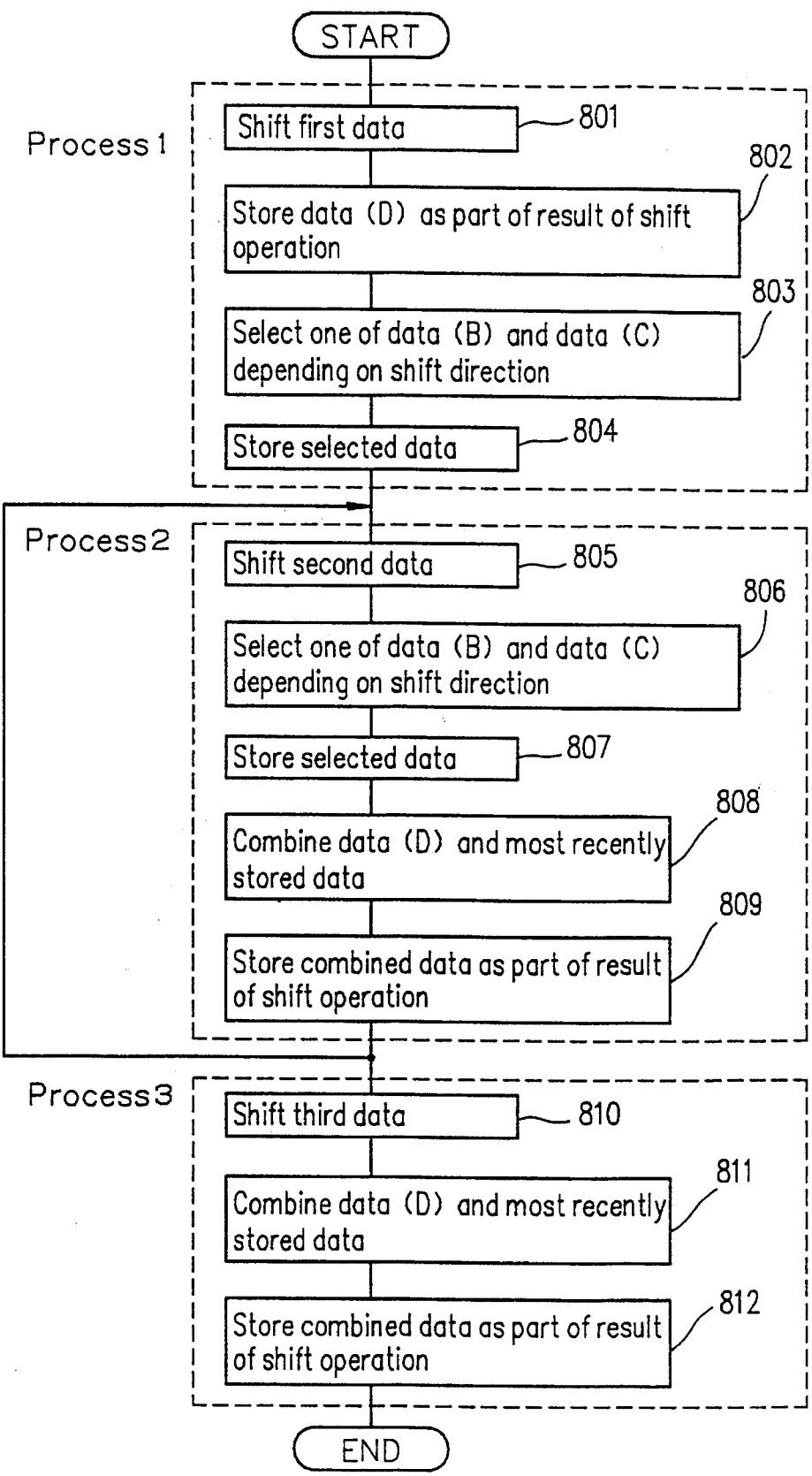
FIG. 8 is a flowchart of a procedure of N-bit leftward M-multiple-precision shift operation according to the present invention.
Figure 9:
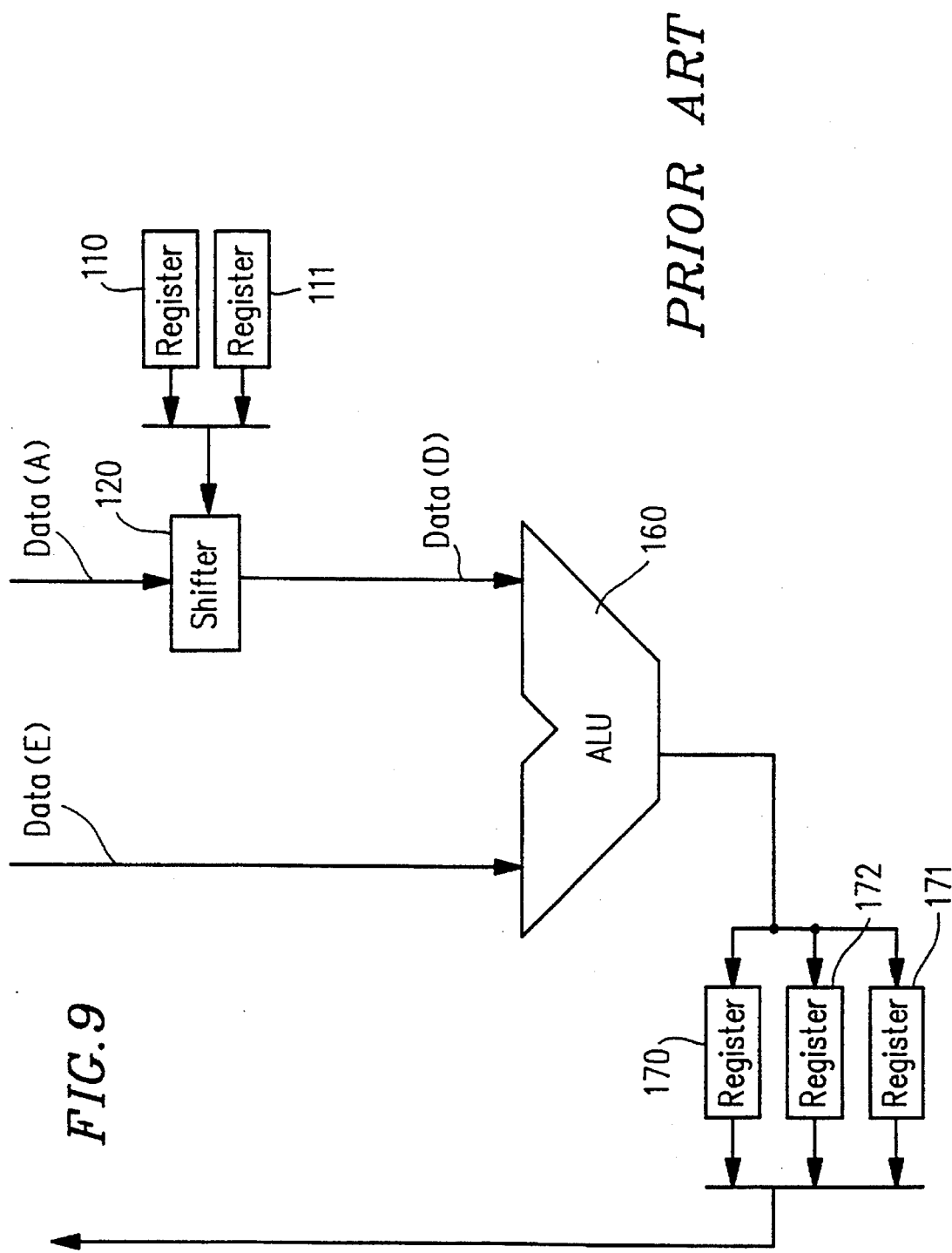
FIG. 9 illustrates a configuration of a conventional shift operation unit.
Figure 10:
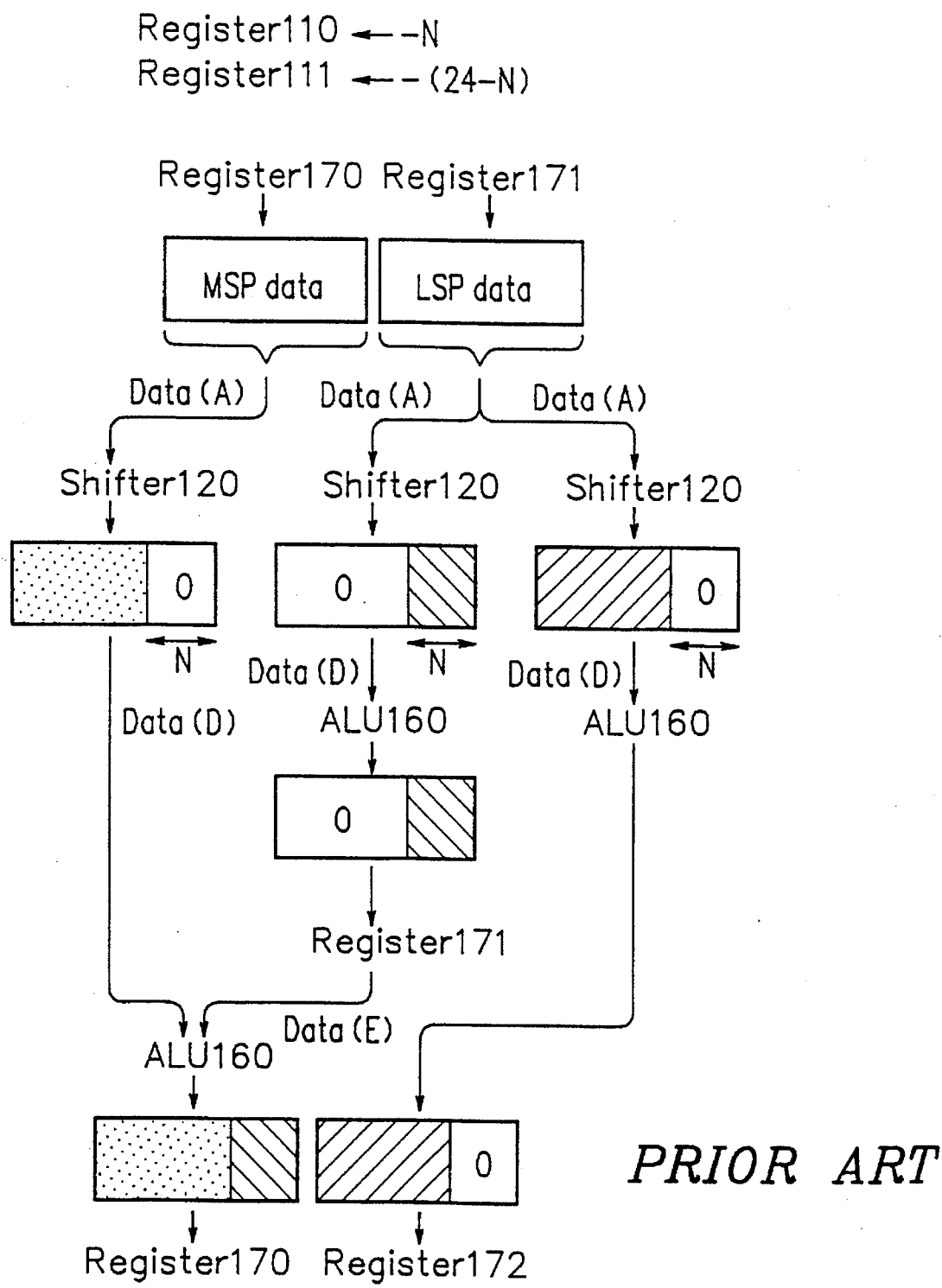
FIG. 10 schematically illustrates a procedure of a conventional double-precision shift operation.

Hereinbelow, the procedure of N-bit M-multiple-precision shift operations will be described with reference to the flowchart of FIG. 8. The N-bit M-multiple-precision shift operation includes process 1 and process 2 repeated by (M-2) times, and process 3. In the following description, M-multiple-precision data to be shifted is composed of one piece of first single precision data, (M-2) piece(s) of second single-precision data, and one piece of third single-precision data. When the shift direction is leftward, the third data is MSP data and the first data is LSP data, with the second data being intermediate data. On the other hand, when the shift direction is rightward, the first data is MSP bit data and the third data is LSP bit data, with the second data being intermediate data.

Process 1 includes following steps 801 to 804:

Step 801: The first data is shifted by N bit(s), and resultant MSP bit data (B), intermediate bit data (D), and LSP bit data (C) are output.

Step 802: The intermediate bit data (D) output in step 801 is stored as part of the result of the shift operation.

Step 803: One of the MSP bit data (B) and the LSP bit data (C) output in step 801 is selected in accordance with the shift direction.

Step 804: The data selected in step 803 is stored.

When the shift direction in step 803 is leftward, the MSP bit data (B) is selected. When the shift direction is rightward, the LSP bit data (C) is selected. Process 1 corresponds to steps 102-1 through 102-4 described above with reference to FIG. 7.

Process 2 includes the following steps 805 through 809:

Step 805: One of the (M-2) piece(s) of second data is shifted by N bit(s), and the resultant MSP bit data (B), intermediate bit data (D), and LSP bit data (C) are output.

Step 806: One of the MSP bit data (B) and the LSP bit data (C) output in step 805 is selected in accordance with the shift direction.

Step 807: The data selected in step 806 is stored.

Step 808: The intermediate bit data (D) output in step 805 and the data stored most recently in steps 804 and 807 are combined. This combination is achieved by executing OR operation, for example.

Step 809: The data combined in step 808 is stored as part of the result of the shift operation.

In step 806, when the shift direction is leftward, the MSP bit data (B) is selected. When the shift direction is rightward, the LSP bit data (C) is selected. Process 2 corresponds to steps 103-1 through 103-4 described above with reference to FIG. 7.

Process 3 includes following steps 810 through 812:

Step 810: The third data is shifted by N bit(s), and the resultant MSP bit data (B), intermediate bit data (D), and LSP bit: data (C) are output.

Step 811: The intermediate bit data (D) output in step 810 and the data stored most recently in step 807 are combined. This combination is achieved by executing the OR operation, for example.

Step 812: The data combined in step 811 is stored as part of the result of the shift operation.

Process 3 corresponds to steps 104-1 through 104-3 described above with reference to FIG. 7.

Thus, by repeating the shift operation by M times, the M-multiple precision shift operation is realized.

Each of processes 1, 2, and 3 is conducted as one step in the execution of the program. Process 2 is repeated by (M-2) times. Accordingly, the M-multiple precision shift operation can be realized by only M steps excluding the setting of the shift counts. A number of registers are required to execute the M-multiple precision shift operation. However, the number of registers can be reduced by using known techniques such as temporary data saving.

Thus, according to the present invention, when double-precision data is shifted leftward, data overflowed from LSP data due to the leftward shift is stored in a register, and the data stored in the register is combined with MSP data which has been shifted leftward. When double-precision data is shifted rightward, data overflowed from MSP data due to the rightward shift is stored in a register, and the data stored in the register is combined with LSP data which has been shifted rightward. In this way, in the double precision shift operation according to the present invention, one shifting can be reduced compared with the double-precision shift operations by use of conventional shift operation units. As described earlier, about 500 thousand times/sec. of double-precision shift operations are required for LD-CELP. Accordingly, by reducing one shifting for each double-precision shift operation, the total active steps at the execution of the program can be reduced by 500 thousand steps/sec. This significantly increases the speed of the entire processing including the double-precision shift operations. Other processing may be executed using the time corresponding to the eliminated active steps. Alternatively, no processing may be executed during such time so as to save power.

Likewise, according to the present invention, the shift operation of M-multiple precision data can be realized by M shiftings (M is an integer equal to or more than 3). As a result, the shift operation of multiple-precision data can be conducted with high efficiency.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A shift operation unit comprising:

shift means for shifting data in accordance with a shift count and outputting most significant part bit data, intermediate bit data, and least significant part bit data;

first selection means coupled to an output of the shift means, for selecting one of the most significant part bit data and the least significant part bit data in accordance with a shift direction;

first storage means coupled to an output of the first selection means, for storing data selected by the first selection means;

operation means coupled to an output of the shift means and an output of the first storage means, for operating the intermediate bit data and the data stored in the first storage means and outputting an operation result; and second storage means coupled to an output of the operation means, for storing the operation result.

2. A shift operation unit according to claim 1, further comprising second selection means for receiving additional data and selecting one of the additional data and the data stored in the first storage means in accordance with a control signal, wherein an output of the second selection means is input into the operation means.

3. A shift operation unit according to claim 1, wherein the shift means includes m $2^k$-bit shifter(s) (k=0, 1, ..., m-1), one $2^m$-bit shifter, and decoding means for decoding the shift count to supply a control signal indicating whether shifting should be executed or not to respective $2^k$-bit shifter(s) and $2^m$-bit shifter, where m is an integer equal to or more than 1.

4. A shift operation unit according to claim 3, wherein a portion of the output of the $2^{m-1}$-bit shifter is equal to the output of the first selecting means.

5. A shift operation unit according to claim 1, wherein the second storage means includes a plurality of registers each storing part of the operation result.

6. A shift operation unit according to claim 1, wherein the second storage means includes a plurality of registers each storing part of the data and a plurality of registers each storing part of the operation result.

7. A shift operation method for executing double-precision shift operation using first data and second data, the method comprising the steps of:

a) shifting the first data in accordance with a shift count and outputting most significant part bit data, intermediate bit data, and least significant part bit data;

b) storing the intermediate bit data output in step a) as part of a result of the shift operation;

c) selecting one of the most significant part bit data and the least significant part bit data output in step a) in accordance with a shift direction;

d) storing the data selected in step c);

e) shifting the second data in accordance with the shift count and outputting most significant part bit data, intermediate bit data, and least significant part bit data;

f) combining the intermediate bit data output in step e) and the data stored in step d); and g) storing the data combined in step f) as part of the result of the shift operation.

8. A shift operation method according to claim 7, wherein the combination in step f) is achieved by executing OR operation of the intermediate bit data output in step e) and the data stored in step d).

9. A shift operation method according to claim 7, wherein steps a) through d) are conducted as one step in the execution of a program, and steps e) through g) are conducted as one step in the execution of the program.

10. A shift operation method for executing multiple-precision shift operation using first data, at least one second data, and third data, the method comprising the steps of:

a) shifting the first data in accordance with a shift count and outputting most significant part bit data, intermediate bit data, and least significant part bit data;

b) storing the intermediate bit data output in step a) as part of a result of the shift operation;

c) selecting one of the most significant part bit data and the least significant part bit data output in step a) in accordance with a shift direction;

d) storing the data selected in step c);

e) shifting one of the at least one second data in accordance with the shift count and outputting most significant part bit data, intermediate bit data, and least significant part bit data;

f) selecting one of the most significant part bit data and the least significant part bit data output in step e) in accordance with a shift direction;

g) storing the data selected in step f);

h) combining the intermediate bit data output in step e) and the data stored most recently in steps d) and g);

i) storing the data combined in step h) as part of the result of the shift operation;

j) shifting the third data in accordance with the shift count and outputting most significant part bit data, intermediate bit data, and least significant part bit data;

k) combining the intermediate bit data output in step j) and the data stored most recently in step g); and l) storing the data combined in step k) as part of the result of the shift operation.

11. A shift operation method according to claim 10, wherein the combination in step h) is achieved by executing OR operation of the intermediate bit data output in step e) and the data stored most recently in steps d) and g).

12. A shift operation method according to claim 10, wherein the combination in step k) is achieved by executing OR operation of the intermediate bit data output in step j) and the data stored most recently in step g).

13. A shift operation method according to claim 10, wherein steps a) through d) are conducted as one step in the execution of a program, steps e) through i) are conducted as one step in the execution of the program, and steps j) through l) are conducted as one step in the execution of the program.

14. A shift operation method according to claim 10, further comprising the step of repeating steps e) through i).

* * * * *

UNITED STATES PATENT AND TRADEMARK OFFICE
CERTIFICATE OF CORRECTION

PATENT NO. : 5,559,730  
DATED : September 24, 1996  
INVENTOR(S) : Shinichi Marui, et al.

Page 1 of 2

It is certified that error appears in the above-indentified patent and that said Letters Patent is hereby corrected as shown below:

Replace the duplicate FIG. 2 on Drawing Sheet 1 of 10 with FIG. 1 as attached.

Signed and Sealed this

Eighth Day of July, 1997

*Attest:*

BRUCE LEHMAN

*Attesting Officer*     Commissioner of Patents and Trademarks